United States Patent
Fang et al.

(10) Patent No.: US 8,606,017 B1
(45) Date of Patent: Dec. 10, 2013

(54) METHOD FOR INSPECTING LOCALIZED IMAGE AND SYSTEM THEREOF

(75) Inventors: Wei Fang, Milpitas, CA (US); Jack Jau, Los Altos Hills, CA (US); Zhao-Li Zhang, San Jose, CA (US)

(73) Assignee: Hermes Microvision, Inc., Hsinchu (TW)

( * ) Notice: Subject to any disclaimer, the term of this patent is extended or adjusted under 35 U.S.C. 154(b) by 331 days.

(21) Appl. No.: 13/073,161

(22) Filed: Mar. 28, 2011

Related U.S. Application Data

(63) Continuation of application No. 12/644,736, filed on Dec. 22, 2009, now abandoned.

(51) Int. Cl.
*G06K 9/46* (2006.01)
*G06K 9/50* (2006.01)

(52) U.S. Cl.
USPC .......................... 382/201; 382/149; 382/144

(58) Field of Classification Search
None
See application file for complete search history.

(56) References Cited

U.S. PATENT DOCUMENTS

| | | | |
|---|---|---|---|
| 7,439,504 B2 * | 10/2008 | Hiroi et al. | 250/310 |
| 7,518,110 B2 * | 4/2009 | Sutani et al. | 250/311 |
| 7,526,143 B2 * | 4/2009 | Yamaguchi et al. | 382/276 |
| 8,103,086 B2 * | 1/2012 | Shi et al. | 382/144 |
| 8,139,844 B2 * | 3/2012 | Chen et al. | 382/145 |
| 8,217,351 B2 * | 7/2012 | Toyoda et al. | 250/311 |

* cited by examiner

*Primary Examiner* — Samir Ahmed
(74) *Attorney, Agent, or Firm* — Huffman Law Group, P.C.

(57) ABSTRACT

A plurality of points with identical geometric feature is compared with their SEM characteristic features to inspect defect in a localized image. Original design information is included in the geometric feature such that absolute compare can be performed in this inspection method. Further, this method can also be applied to the localized image with or without repeated or redundant pattern.

26 Claims, 5 Drawing Sheets

METHOD FOR INSPECTING LOCALIZED IMAGE AND SYSTEM THEREOF

BACKGROUND OF THE INVENTION

1. Field of the Invention

The present invention is related to a method for inspecting localized image and a system thereof, and more particularly to a method for inspecting a defect on an image of a mask/semiconductor element and an applied inspection system thereof.

2. Description of the Prior Art

How to inspect defects on a semiconductor element is one of the major subjects of a semiconductor process. A prior art method for inspecting defects includes capturing a scanned image of a semiconductor element, such as a scanning electron microscope (SEM) image, and then determining the presence of a defect of the semiconductor element in the scanned image.

A prior art method of cell-to-cell inspection is applied on a semiconductor element with repeated pattern, such as a memory chip. Referring to FIG. 1, a scanned image 1 includes a plurality of repeated patterns 11, and the method of cell-to-cell inspection is performed to compare differences between the repeated patterns 11 to determine the presence of a defect. However, the method of cell-to-cell inspection is not suitable to be applied on a semiconductor element without any repeated pattern.

Another prior art method of die-to-die inspection can be applied on a semiconductor element without repeated pattern, such as a logical chip. Referring to FIG. 2, scanned images 2 and 2' include irregular patterns 21 and 21', and the method of die-to-die inspection is performed to compare differences between the irregular patterns 21 and 21' in different scanned images 2 and 2' to determine the presence of a defect. However, inherent differences between the scanned images 2 and 2' may cause a higher fault rate. For example, these dies may have no defect and yet images of different dies may still have variant gray levels, or distort differently due to their respective charge distributions, or topographies, etc. It is, therefore, difficult to determine the presence of a defect on an SEM image by the method of die-to-die inspection. Contrarily, the problem with the die-to-die inspection would be less likely to occur when using the method of cell-to-cell inspection because the probability of distortion on one die is relatively smaller.

It should be noted that the methods of cell-to-cell and die-to-die inspection each possesses its own advantages, but they can not be implemented simultaneously. Furthermore, the foregoing methods compare images between cells or dies without the basis of the original design, and therefore accuracy of inspection can not be improved efficiently.

Accordingly, it is highly desirable to provide a method for inspecting localized image with or without repeated patterns avoiding the foregoing drawback.

SUMMARY OF THE INVENTION

The present invention is directed to a method for determining an inconsistency in an image and its applications, a method which constructs the geometric features on the basis of the original design so as to perform an absolute comparison, and therefore the accuracy and sensitivity of defect inspection may be enhanced and the fault rate may be decreased. Moreover, by comparing points with identical geometric features on a localized image, such as a scanned or captured die image, to determine the presence of a defect, systematic errors from different die images can be excluded, and the present invention can be applied to localized images with or without repeated or periodic patterns.

In one embodiment, the proposed method for determining an inconsistency in an image translated from a vector pattern, includes steps of: quantizing the vector pattern into a plurality of first points; calculating geometric features of the plurality of first points; identifying from the image a plurality of second points corresponding to the plurality of first points; and comparing measurement value of the plurality of second points with identical geometric features.

In one embodiment, the proposed computer readable medium encoded with a computer program implementing a method for determining an inconsistency in an image, wherein the image is translated from a vector pattern and the method comprises steps of: quantizing the vector pattern into a plurality of first points; calculating geometric features of the plurality of first points; identifying from the image a plurality of second points corresponding to the plurality of first points; and comparing measurement value of the plurality of second points with identical geometric feature.

In one embodiment, the proposed charged particle beam inspection system includes a charged particle beam probe generator, a charged particle beam deflection module, an image forming apparatus and an inconsistency determination module. The charged particle beam probe generator is used for generating a charged particle beam probe. The charged particle beam deflection module is used for scanning the charged particle beam probe across a surface of a sample. The image forming apparatus is used for detecting secondary charged particles emitted from the sample being bombarded by the charged particle beam probe and forming at least one charged particle microscopic image of the sample accordingly. The inconsistency determination module is coupled with the image forming apparatus and is encoded with a computer program implementing a method for determining an inconsistency in an image, wherein the image is translated from a vector pattern and the method comprises steps of: quantizing the vector pattern into a plurality of first points; calculating geometric features of the plurality of first points; identifying from the image a plurality of second points corresponding to the plurality of first points; and comparing measurement value of the plurality of second points with identical geometric feature.

In one embodiment, the proposed method for comparing points in an image that is composed of individual pixels each with its own grey level and is translated from a vector pattern comprises steps of: quantizing the vector pattern into a plurality of first points; calculating geometric features of the plurality of first points; identifying from the image a plurality of second points corresponding to the plurality of first points; and comparing the grey level characteristics of the plurality of second points with identical geometric feature.

In one embodiment, the proposed method for detecting a defect on an SEM image comprises steps of: aligning the SEM image to a vector pattern of a corresponding original design; quantizing geometric polygons of the vector pattern into a plurality of first points; calculating geometric features of the plurality of first points; identifying from the SEM image a plurality of second points corresponding to the plurality of first points; and comparing SEM characteristics of the plurality of second points with identical geometric feature.

In one embodiment, the proposed method for inspecting an SEM image of a mask comprises steps of: aligning the SEM image to a vector pattern of a corresponding original design; quantizing geometric polygons of the vector pattern into a plurality of first points; calculating geometric features of the plurality of first points; identifying from the SEM image a plurality of second points corresponding to the plurality of first points; and comparing SEM characteristics of the plurality of second points with identical geometric feature.

In one embodiment, the proposed apparatus for detecting a defect on an image comprises means for aligning the image to a vector pattern of a corresponding original design; means for quantizing geometric polygons of the vector pattern into a plurality of first points; means for calculating geometric features of the plurality of first points; means for identifying from the image a plurality of second points corresponding to the plurality of first points; and means for comparing the plurality of second points with identical geometric feature.

The objective, technologies, features and advantages of the present invention will become apparent from the following description in conjunction with the accompanying drawings wherein are set forth, by way of illustration and example, certain embodiments of the present invention.

BRIEF DESCRIPTION OF THE DRAWINGS

The foregoing conceptions and their accompanying advantages of this invention will become more readily appreciated after being better understood by referring to the following detailed description, In conjunction with the accompanying drawings, wherein.

DESCRIPTION OF THE PREFERRED EMBODIMENT

The detailed explanation of the present invention is described as follows. The described preferred embodiments are presented for purposes of illustrations and description, and they are not intended to limit the scope of the present invention.

Figure 1:
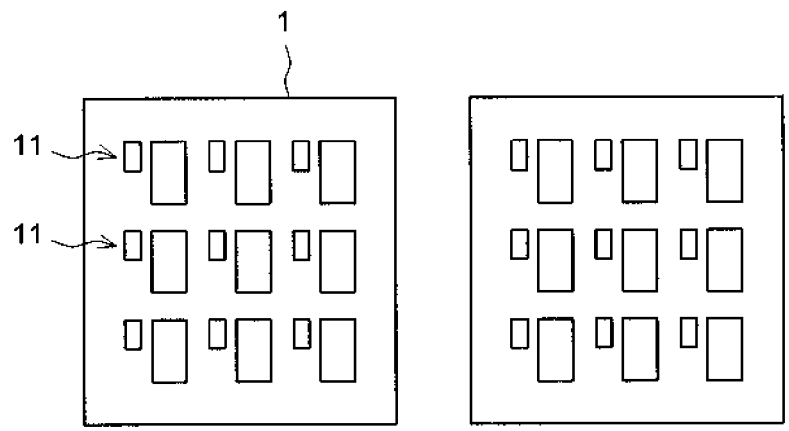
FIG. 1 is a diagram schematically illustrating a method of cell-to-cell inspection according to a prior art.
Figure 2:
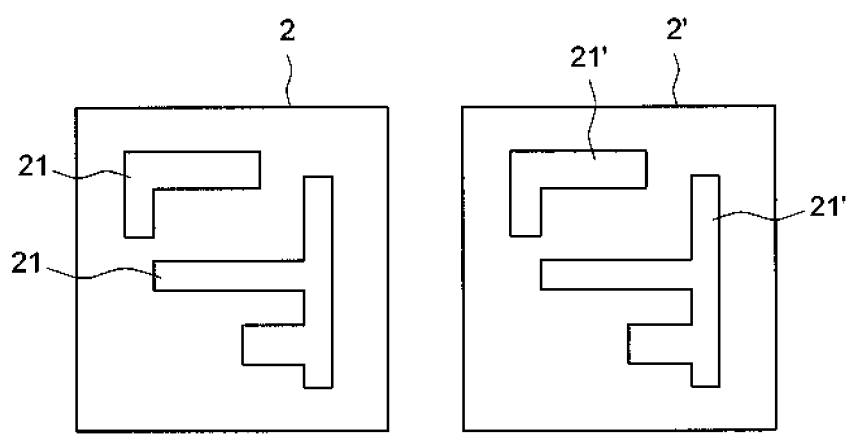
FIG. 2 is a diagram schematically illustrating a method of die-to-die inspection according to a prior art.
Figure 3:
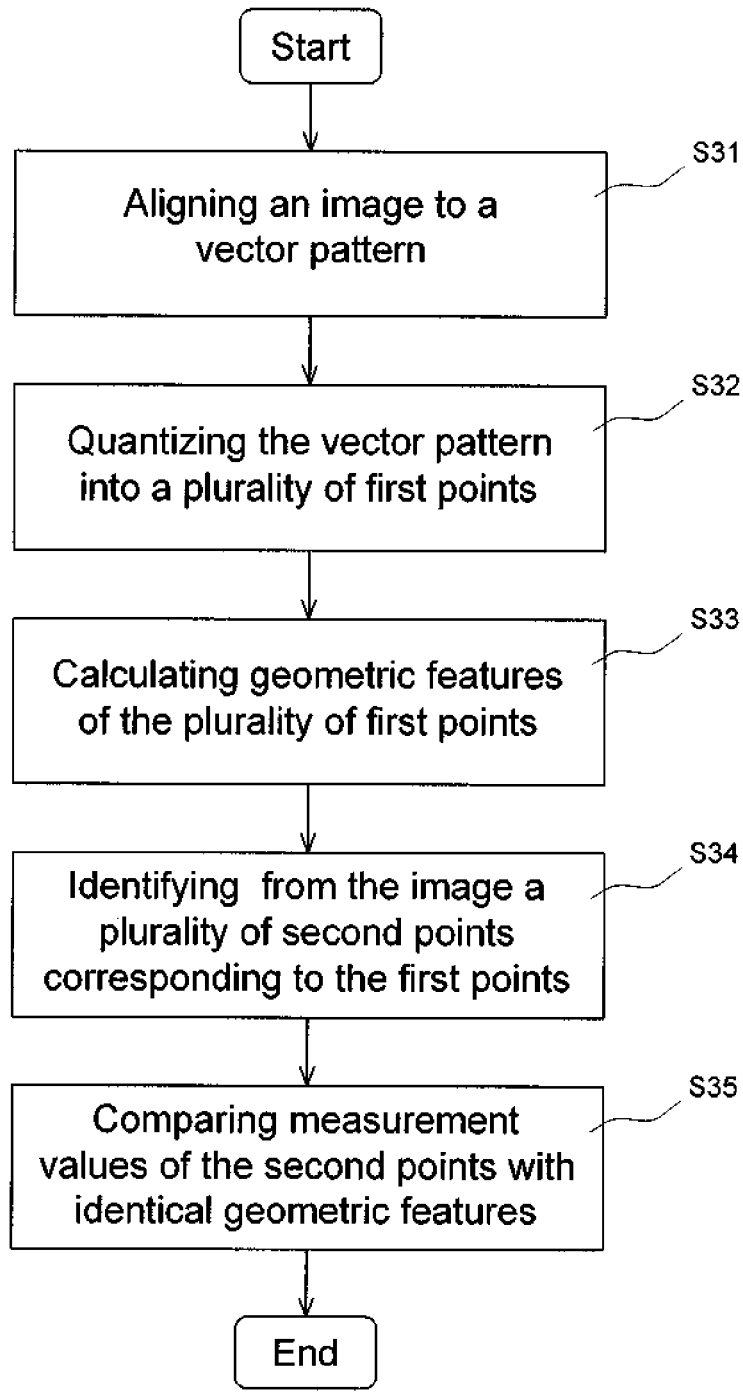
FIG. 3 is a flow chart schematically illustrating a method for determining an inconsistency in an image according to an embodiment of the present invention.
Figure 4:
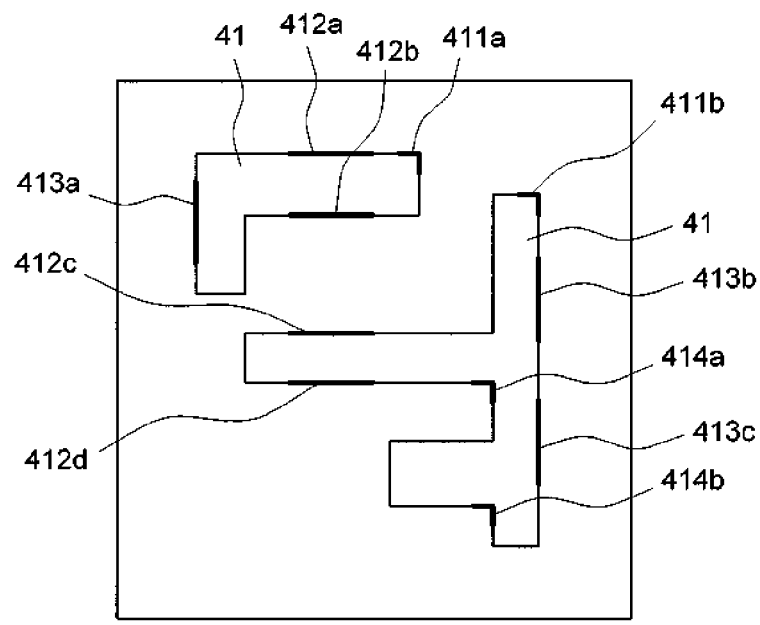
FIG. 4 is a diagram schematically illustrating a vector pattern of original design.
Figure 5:
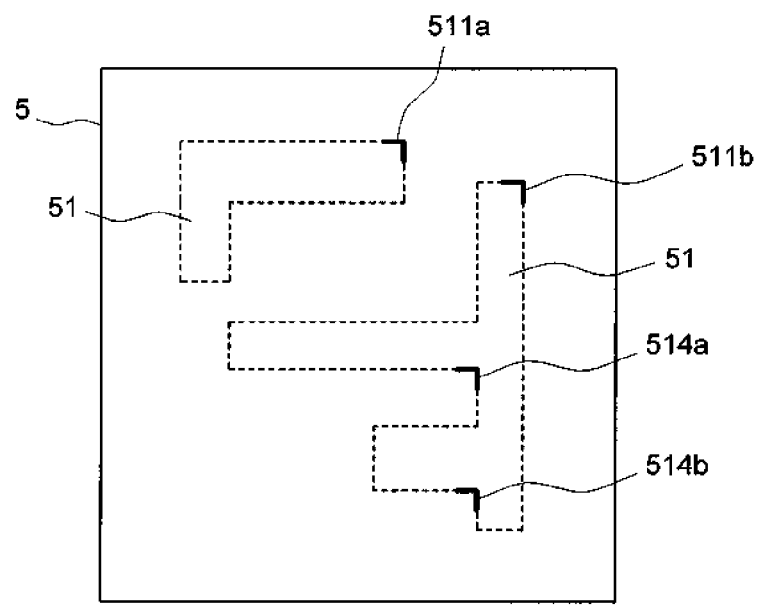
FIG. 5 is a diagram schematically illustrating a vector pattern of an image.

Please refer to FIG. 3 to FIG. 5 for an illustration of a method for determining an inconsistency in an image, such as a scanned image by using SEM, or a captured image by using optical detection means. The optical detection means here includes any facility for inspecting or detecting defects by using electromagnetic waves at different wavelengths. Firstly, an image 5 is aligned to a vector pattern 41 (S31). In one embodiment, the image 5 can be not only a scanning electron microscope (SEM) image of a semiconductor element or a mask, but also an optical-detection captured image of a semiconductor element or a mask. The vector pattern 41 may be the original design of the semiconductor element or mask in Graphic Data System (GDS) or Open Artwork System Interchange Standard (OASIS), etc. By aligning the image 5 to the vector pattern 41, the image 5 has a corresponding vector pattern 51.

Next, the vector pattern 41 is quantized into a plurality of first points (S32), and geometric features of the plurality of first points of the vector pattern 41 are calculated (S33). It should be noted that the number of quantized points can be arbitrarily decided by users. To facilitate understanding, geometric features of the vector pattern 41 are illustrated in FIG. 4. Details regarding the geometric features of the first points would be provided later. For example, line segments 411a, 412a, 413a and 414a represent different geometric features respectively. The line segment 411a, 414a represents a corner from left to right and then from top to bottom; the line segment 412a represents a horizontal straight line; the line segment 413a represents a vertical straight line.

Then, a plurality of second points within the image 5 is identified in accordance with the plurality of first points (S34). For example, line segments 511a, 511b, 514a and 514b corresponding to the line segments 411a, 411b, 414a and 414b may be identified from the image 5. Finally, measurement values of the second points with identical geometric features are compared to determine the presence of a defect (S35). For example, the line segments 511a and 511b have identical geometric features (i.e. a corner from left to right and then from top to bottom). Therefore, the line segments 511a and 511b are comparable to each other; similarly, the line segment 514a is compared with the line segment 514b. Any difference among the line segments 511a and 511b, 514a and 514b, indicates there may be a defect on them. In one embodiment, the measurement value may be a gray feature, such as the gray value of pixel of the image 5.

Figure 6:
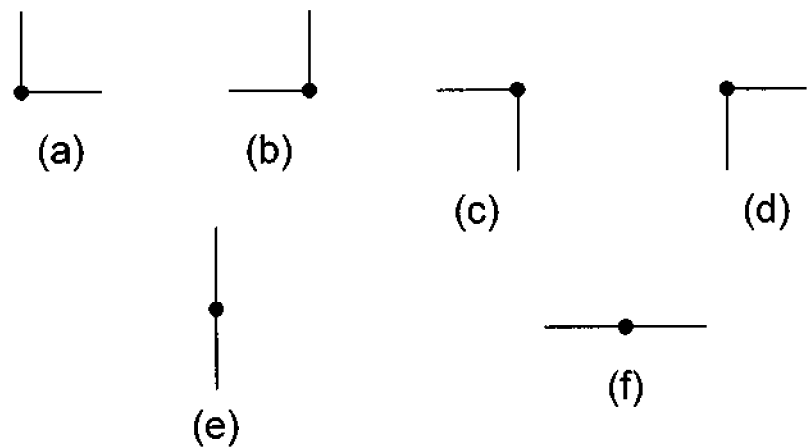
FIG. 6 is a diagram schematically illustrating geometric features of points.
Figure 7:
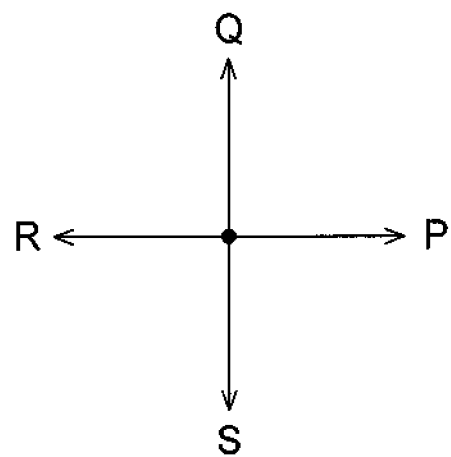
FIG. 7 is a diagram schematically illustrating direction relationships between points.

Please refer to FIG. 6 for illustrations of the geometric feature of points of the vector pattern. The vector pattern 41, as illustrated in FIG. 4, includes a plurality of geometric polygons; therefore, the geometric features of points of the vector pattern 41 can be generalized in corners with four directions, horizontal straight line and vertical straight line as illustrated in FIGS. 6(a)~(f). Referring to FIG. 7 together, in one embodiment, the geometric feature of a point may be represented by direction relationship from the point to another two points, such as adjacent or nonadjacent points. For example, the geometric feature of the point illustrated in FIG. 6(a) may be represented by a 4-tuple (P, Q, R, S)=(1, 1, 0, 0), wherein each element is associated with a direction relationship with the point and indicates whether an adjacent point of such direction relationship is present. By the same rule, the geometric feature of the point illustrated in FIG. 6(b) may be represented by (0, 1, 1, 0); the geometric feature of the point illustrated in FIG. 6(e) may be represented by (0, 1, 0, 1), and so on. Therefore, the geometric feature of each point of the corresponding vector pattern 51 of the image 5 can be calculated, and the measurement value of the points with identical geometric features can be compared.

In one embodiment, the geometric feature of a point of the vector pattern may be represented by the phase relationship between the points and its adjacent points, where the point is treated as the origin. For example, the geometric feature of the point illustrated in FIG. 6(a) may be represented by $(0, i\pi/2)$; the geometric feature of the point illustrated in FIG. 6(b) may be represented by $(i\pi/2, i\pi)$; the geometric feature of the point illustrated in FIG. 6(e) may be represented by $(i\pi/2, i3\pi/2)$, and so on.

In one embodiment, the geometric feature of a point of the vector pattern may also be represented by included angle between lines from the point to another two points. For example, the geometric feature of the points illustrated in FIGS. 6(a)~(d) may be represented by 90°; the geometric feature of the points illustrated in FIGS. 6(e) and (f) may be represented by 180°. It should be noted that the geometrical features of the points illustrated in FIGS. 6(a)~(d) can still be regarded as substantially the same and can be compared with each other even though they have different orientations. For example, when the measurement values in a unit region including the point are averaged, the average result would have no difference with respect to the variety of corner orientations. Therefore, the points illustrated in FIGS. 6(a)~(d) can be compared with each other. Similarly, the line segments 412a~412d illustrated in FIG. 4 can be compared not only with each other, but also with the line segments 413a~413c.

It should be noted that the foregoing embodiment is illustrated by geometric polygon with right angle, but not to be limited, the method of the present invention can be also applied to geometric polygon of arbitrary shape.

A computer readable medium according to an embodiment of the present invention is encoded with a computer program which is used for implementing a method for determining an inconsistency in an image illustrated in FIG. 3. Detail implementing steps of the method of the present invention has been described previously and will not be repeated here.

It should be noted that the present invention not only is the above-mentioned method for determining an inconsistency in an image, but also is a method for comparing points in an image. Besides, the present invention has various applications, such as a method and apparatus for detecting a defect on a SEM image, a method for inspecting an SEM image of a mask, etc.

Figure 8:
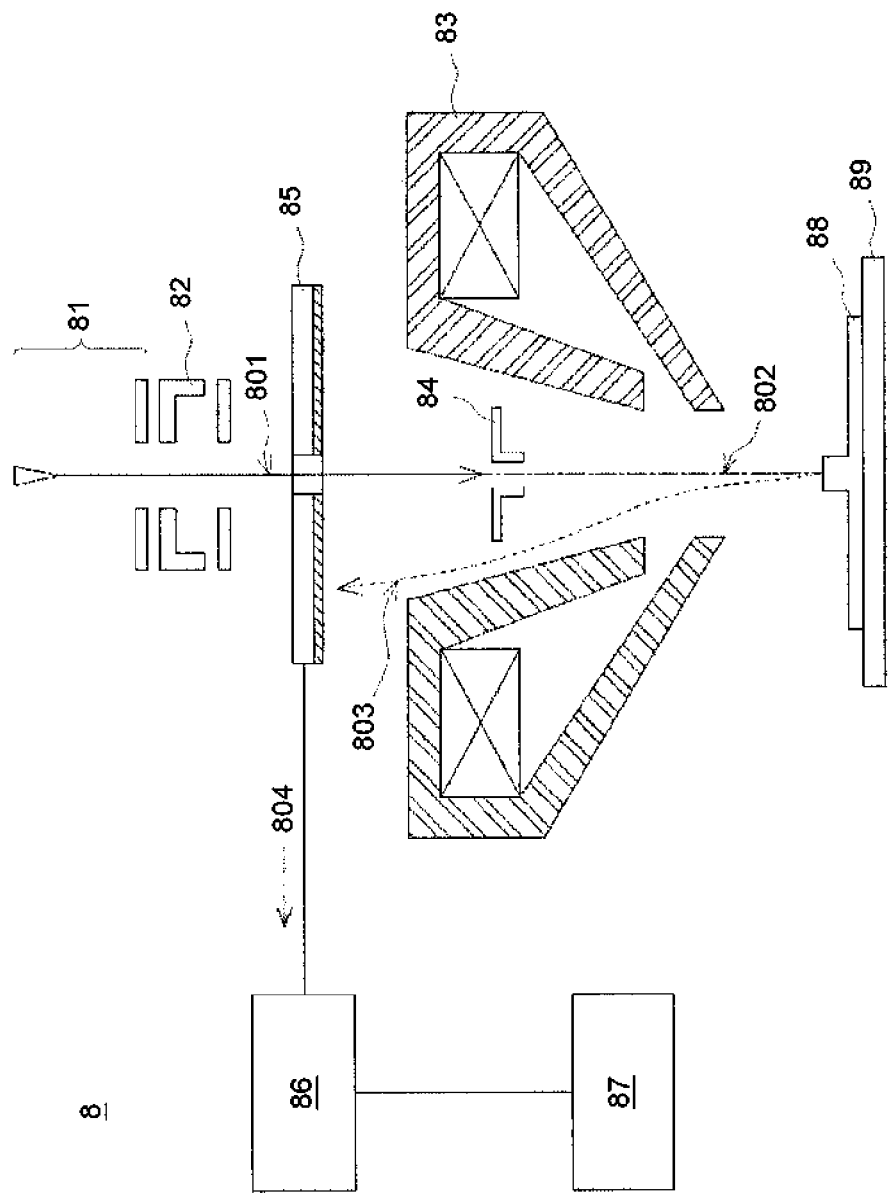
FIG. 8 is a diagram schematically illustrating a charged particle beam inspection system according to an embodiment of the present invention.

Please refer to FIG. 8 to illustrate a charged particle beam inspection system 8 according to an embodiment of the present invention. Nevertheless, other optical inspection system can also be applied in this invention. The charged particle beam inspection system 8 is used for inspecting a sample 88 on a sample stage 89 and comprises a charged particle beam generator 81, a condenser lens module 82, a probe forming objective lens module 83, a charged particle beam deflection module 84, a secondary charged particle detector module 85, an image forming module 86 and a inconsistency determination module 87. The charged particle beam generator 81 is used for generating a primary charged particle beam 801. The condenser lens module 82 is used for condensing the generated primary charged particle beam 801. The probe forming objective lens module 83 is used for focusing the condensed primary charged particle beam into a charged particle beam probe 802. The charged particle beam deflection module 84 is used for scanning the formed charged particle beam probe 802 across a surface of the sample 88 secured on the sample stage 89. In one embodiment, charged particle beam generator 81, condenser lens module 82 and probe forming objective lens module 83, or their equivalent designs, alternatives or any combination thereof, together form a charged particle beam probe generator which generates the scanning charged particle beam probe 802.

The secondary charged particle detector module 85 is used for detecting secondary charged particles 803 emitted from the sample surface (may also be along with other reflected or scattered charged particles from the sample surface) upon being bombarded by the charged particle beam probe 802 to generate a secondary charged particle detection signal 804. The image forming module 86 is coupled with the secondary charged particle detector module 85 for receiving the secondary charged particle detection signal 804 from the secondary charged particle detector module 85 and forming at least one charged particle microscopic image accordingly. The image forming module 86 may be a mainframe host, terminals, personal computers, any kind of mobile computing devices or combination thereof. In addition, the image forming module 86 may connect the secondary charged particle detector module 85 through a medium selected from the following: cable wire, optical fiber cable, portable storage media, IR, Bluetooth, intranet, internet, wireless network, wireless radio, or any combination thereof. In one embodiment, secondary charged particle detector module 85 and image forming module 86, or their equivalent designs, alternatives or any combination thereof, together form an image forming apparatus which forms a charged particle microscopic image from detected secondary charged particles emitted from sample 88 being bombarded by charged particle beam probe 802.

The above components of a charged particle beam inspection system are well known to those skilled in the art and are not presented here to limit the scope of the present invention. Alternatives, equivalents and modifications of these components should still be within the scope of disclosure of the present invention.

The inconsistency determination module 87 is coupled to the image forming module 86 of the image forming apparatus to determine the presence of a inconsistency within the charged particle microscopic image received from image forming module 86. In one embodiment, the inconsistency determination module 87 connects and accesses the image forming apparatus through a medium selected from the following: cable wire, optical fiber cable, portable storage media, IR, human manual input, Bluetooth, intranet, internet, wireless network, wireless radio, or any combination thereof. Further, the inconsistency determination module 87 may be implemented as one selected from the following: a mainframe host, a terminal computer, a personal computer, any kind of mobile computing devices, or any combination thereof. In one embodiment, a computer program for determining the inconsistency is encoded on a computer readable medium disposed within the inconsistency determination module 87 so that the inconsistency determination module 87 is able to perform the steps of inconsistency determination illustrated in conjunction with FIG. 3, wherein the details of the steps of difference determination is described earlier.

To summarize the foregoing descriptions, a method for determining an inconsistency in an image and its applications according to the present invention is implemented to quantize a vector pattern of the original design into a plurality of first points including geometric features, identify from the image a plurality of corresponding second points, and then compare measurement value of the second points with identical geometric features to determine the presence of a defect within the image. Instead of using the relative comparison of the cell-to-cell and die-to-die inspections, the method of the present invention including the original design information can be implemented to perform an absolute and accurate comparison to determine the presence of a defect, such that the accuracy and sensitivity of defect inspection can be enhanced and a fault rate can be decreased. Furthermore, by comparing points with identical geometric features on a localized image, such as a scanned die image, to determine the presence of a defect, systematic errors from different die images can be excluded, and the present While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A method for determining by a computing device an inconsistency in an image, wherein the image is translated from a vector pattern and the method comprises steps of:
aligning the image to the vector pattern including an original design of the image;
quantizing the vector pattern into a plurality of first points;
calculating geometric features of the plurality of first points;
identifying from the image a plurality of second points corresponding to the plurality of first points;
comparing measurement values of second points with identical geometric features; and
determining the inconsistency in the image based on said step of comparing.

2. The method for determining an inconsistency in an image according to claim 1, wherein the vector pattern comprises geometric polygons.

3. The method for determining an inconsistency in an image according to claim 1, wherein the geometric features comprises angle between lines from a point to another two points, phase of a point with respect to another point, direction relationship from a point to another few points or any combination thereof.

4. The method for determining an inconsistency in an image according to claim 3, wherein the measurement values comprises a gray feature.

5. The method for determining an inconsistency in an image according to claim 4, wherein the image comprises a scanned image by using scanning electron microscope (SEM), or a captured image by using optical detection means.

6. The method for determining an inconsistency in an image according to claim 5, wherein the image comprises a scanning electron microscope (SEM) image.

7. The method for determining an inconsistency in an image according to claim 5, wherein the image comprises a SEM image of a semiconductor element or mask.

8. A non-transitory computer readable medium encoded with a computer program implementing a method for determining an inconsistency in an image, wherein the image is translated from a vector pattern and the method comprises steps of:
aligning the image to the vector pattern including an original design of the image;
quantizing the vector pattern into a plurality of first points;
calculating geometric features of the plurality of first points;
identifying from the image a plurality of second points corresponding to the plurality of first points;
comparing measurement values of second points with identical geometric features; and
determining the inconsistency in the image based on said step of comparing.

9. The computer readable medium according to claim 8, wherein the vector pattern comprises geometric polygons.

10. The computer readable medium according to claim 8, wherein the geometric features comprises angle between lines from a point to another two points, phase, phase of a point with respect to another point, direction relationship from a point to another few points or any combination thereof.

11. The computer readable medium according to claim 9, wherein the measurement values comprises a gray feature.

12. The computer readable medium according to claim 11, wherein the image comprises a scanned image by using scanning electron microscope (SEM), or a captured image by using optical detection means.

13. The computer readable medium according to claim 12, wherein the image comprises a scanning electron microscope (SEM) image.

14. The computer readable medium according to claim 12, wherein the image comprises an SEM image of a semiconductor element or mask.

15. A charged particle beam inspection system, comprising:
a charged particle beam probe generator for generating a charged particle beam probe;
a charged particle beam deflection module for scanning the charged particle beam probe across a surface of a sample;
an image forming apparatus for detecting secondary charged particles emitted from the sample being bombarded by the charged particle beam probe and forming at least one charged particle microscopic image of the sample accordingly; and
an inconsistency determination module being coupled with the image forming apparatus and encoded with a computer program implementing a method for determining an inconsistency in an image, wherein the image is translated from a vector pattern and the method comprises steps of:
aligning the image to the vector pattern including an original design of the image;
quantizing the vector pattern into a plurality of first points;
calculating geometric features of the plurality of first points;
identifying from the image a plurality of second points corresponding to the plurality of first points;
comparing measurement values of second points with identical geometric features; and
determining the inconsistency in the image based on said step of comparing.

16. The charged particle beam inspection system according to claim 15, wherein the vector pattern comprises geometric polygons.

17. The charged particle beam inspection system according to claim 15, wherein the geometric features comprises included angle between lines from a point to another two points, phase of a point with respect to another point, direction relationship from a point to another few points or any combination thereof.

18. The charged particle beam inspection system according to claim 16, wherein the measurement values comprises a gray feature.

19. The charged particle beam inspection system according to claim 18, wherein the image comprises a scanned image by using scanning electron microscope (SEM), or a captured image by using optical detection means.

20. The charged particle beam inspection system according to claim 19, wherein the image comprises a scanning electron microscope (SEM) image.

21. The charged particle beam inspection system according to claim 19, wherein the image comprises an SEM image of a semiconductor element or mask.

22. A method for comparing points in an image within a computing device to determine an inconsistency, wherein the image is composed of individual pixels each with its own grey level and is translated from a vector pattern, the method comprising steps of:
aligning the image to the vector pattern including an original design of the image;
quantizing the vector figure into a plurality of first points;
calculating geometric features of the plurality of first points;

identifying from the image a plurality of second points corresponding to the plurality of first points;

comparing grey level characteristics of second points with identical geometric features; and determining the inconsistency in the image based on said step of comparing.

23. A method for detecting a defect on a SEM image, comprising steps of:

aligning the SEM image to a vector pattern of a corresponding original design;

quantizing geometric polygons of the vector pattern into a plurality of first points;

calculating geometric features of the plurality of first points;

identifying from the SEM image a plurality of second points corresponding to the plurality of first points;

comparing measurement values of second points with identical geometric features; and determining the defect in the image based on said step of comparing.

24. A method for inspecting an SEM image of a mask, the method comprising steps of:

aligning the SEM image to a vector pattern of a corresponding original design;

quantizing geometric polygons of the vector pattern into a plurality of first points;

calculating geometric features of the plurality of first points;

identifying from the SEM image a plurality of second points corresponding to the plurality of first points; and comparing measurement values of second points with identical geometric features; and inspecting the SEM image based on said step of comparing.

25. An apparatus for detecting a defect on an image, comprising:

means for aligning the image to a vector pattern of a corresponding original design;

means for quantizing geometric polygons of the vector pattern into a plurality of first points;

means for calculating geometric features of the plurality of first points;

means for identifying from the image a plurality of second points corresponding to the plurality of first points; and means for comparing measurement values of second points with identical geometric features; and means for determining the defect in the image based on said means for comparing.

26. An apparatus for detecting a defect on an image according to claim 25, wherein the image comprises a scanned image by using scanning electron microscope (SEM), or a captured image by using optical detection means.

* * * * *